(No Model.)

W. E. MILLER.
VEHICLE ATTACHMENT.

No. 488,083. Patented Dec. 13, 1892.

WITNESSES:
John Buckler
Isabel Chester

INVENTOR
W. E. Miller
BY A. M. Pierce
ATTORNEY

UNITED STATES PATENT OFFICE.

WILLIAM E. MILLER, OF BROOKLYN, NEW YORK.

VEHICLE ATTACHMENT.

SPECIFICATION forming part of Letters Patent No. 488,083, dated December 13, 1892.

Application filed June 23, 1892. Serial No. 437,716. (No model.)

*To all whom it may concern:*

Be it known that I, WILLIAM E. MILLER, a citizen of the United States, residing at Brooklyn, in the county of Kings and State of New York, have invented a new and useful Improvement in Vehicle Attachments, of which the following is a specification.

My invention relates especially to means and mechanism employed for holding the shafts of vehicles in an elevated or horizontal position, and has for its object the provision of simple, cheap, and effective devices whereby the shafts or thills of a truck or wagon may be adjustably held in any desired position, preventing the weight thereof coming upon the saddle or the back of the horse while the vehicle is in use and holding the shafts up from the ground when the vehicle wherewith my attachments are employed is not in use.

To attain the desired end, my invention consists, essentially, in adjustable bars or arms arranged to be secured to the front axle of a vehicle, said arms passing outward and bearing at their free extremities vertically-adjustable yokes wherein the shafts may rest; and my invention also involves certain other novel and useful combinations or arrangements of parts and peculiarities of construction and operation, all of which will be hereinafter first fully described, and then pointed out in the claims.

Figure 1:
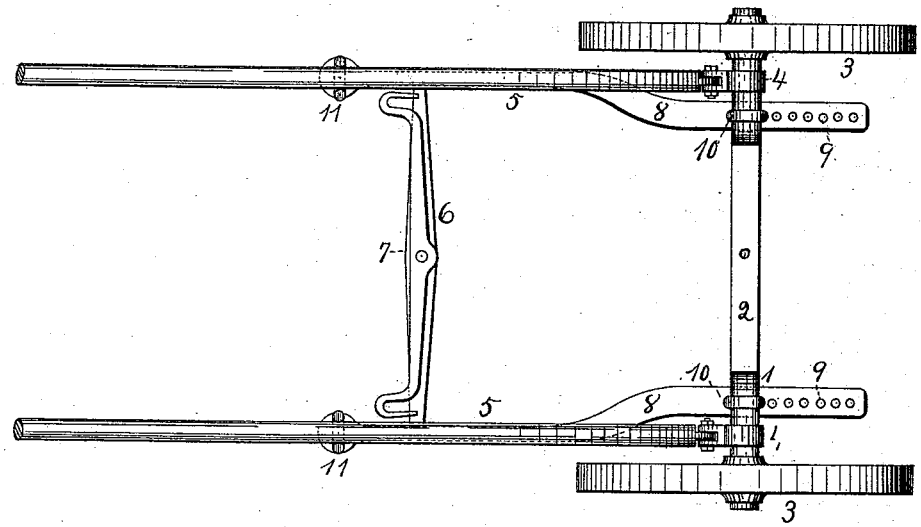
Figure 2:
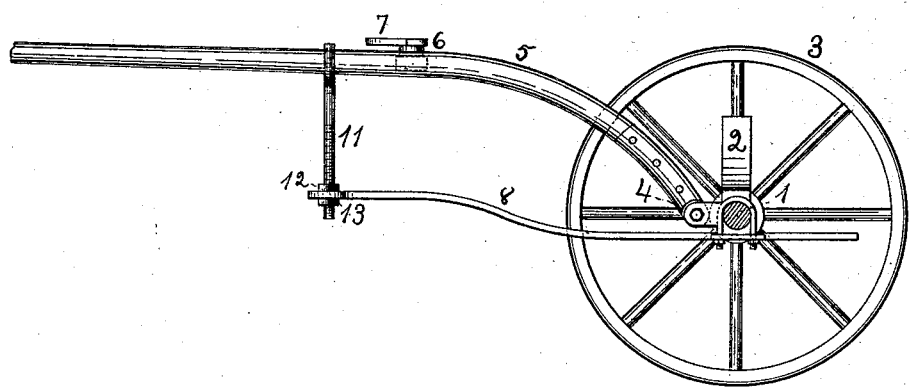

In the accompanying drawings, Figure 1 is a plan view of the front axle, wheels, and shafts wherewith my device is employed. Fig. 2 is a side view thereof with one of the wheels removed.

Similar numerals of reference wherever they occur indicate corresponding parts in both figures.

1 is the front axle of a truck or wagon, arranged in any suitable and well-known manner. 2 is the bolster supported thereon.

3 are the wheels.

4 are thill-couplings secured to the axle, and 5 are the shafts or thills.

6 is a cross-piece connecting the thills.

7 is a singletree.

8 are arms having perforations 9 in their inner ends, and 10 are clips whereby arms 8 may be adjustably secured to the axle. The outer extremities of arms 8 are perforated for the reception of yokes 11, made vertically adjustable by means of nuts 12 and 13. (See Fig. 2.)

When constructed and arranged as above described, the operation of my attachments is as follows: They may be secured rigidly to the axle of any truck or wagon, and as they are made longitudinally adjustable the yokes 11 may be brought to support the thills at any desired point. The yokes being vertically adjustable, the thills may be supported at the proper point to relieve the back of the horse from all pressure, an object of much importance where the back is tender or has become sore from the pressure of the harness-saddle. When the horse is removed from between the thills, they will be supported above the ground, keeping their extremities out of the dirt and preventing breakage by reason of being stepped upon, &c. To prevent the jumping of the thills from the yokes, any suitable keeper may be placed thereover.

Having now fully described my invention, what I claim as new therein, and desire to secure by Letters Patent, is—

1. The combination, with the forward axle and the thills of a vehicle, of supporting-arms rigidly secured to the axle, extending beneath the thills, and bearing yokes wherein the thills rest, substantially as shown and described.

2. The combination, with the forward axle and the thills of a vehicle, of supporting-arms adjustably secured to the axle and bearing yokes at their outer extremities, wherein the thills rest, substantially as shown and described.

3. The combination, with the forward axle and thills of a vehicle, of arms rigidly secured to the axle, extending beneath the thills, and bearing vertically-adjustable yokes wherein the thills rest and are supported, substantially as shown and described.

WILLIAM E. MILLER.

Witnesses:
A. M. PIERCE,
G. F. PIERCE.